United States Patent
Steven et al.

(10) Patent No.: US 9,227,777 B2
(45) Date of Patent: Jan. 5, 2016

(54) CAPSULE CONTAINING NUTRITIONAL INGREDIENTS AND METHOD OF DELIVERY OF A NUTRITIONAL LIQUID FROM THE CAPSULE

(75) Inventors: Matthew David Steven, Cavite (PH); Conchita Tran, Gimel (CH); Frederic Doleac, Vaux et Chantegrue (FR); Heinz Wyss, Oberdiessbech (CH)

(73) Assignee: Nestec S.A., Vevey (CH)

( * ) Notice: Subject to any disclaimer, the term of this patent is extended or adjusted under 35 U.S.C. 154(b) by 591 days.

(21) Appl. No.: 12/864,449

(22) PCT Filed: Jan. 8, 2009

(86) PCT No.: PCT/EP2009/050151
§ 371 (c)(1),
(2), (4) Date: Sep. 28, 2010

(87) PCT Pub. No.: WO2009/092628
PCT Pub. Date: Jul. 30, 2009

(65) Prior Publication Data
US 2011/0020497 A1    Jan. 27, 2011

(30) Foreign Application Priority Data
Jan. 24, 2008    (EP) ..................................... 08100901

(51) Int. Cl.
*B65B 29/06*    (2006.01)
*A23L 1/30*    (2006.01)
(Continued)

(52) U.S. Cl.
CPC ............. *B65D 85/8043* (2013.01); *A23L 1/293* (2013.01); *A23L 1/296* (2013.01);
(Continued)

(58) Field of Classification Search
CPC ............... B65D 85/8043; B65D 81/32; A23V 2200/3202; A23L 1/296; A23L 1/3014; A47J 31/407; A47J 31/0668; A47J 31/3623; A47J 31/3676
USPC ........ 426/77–84, 580, 587–588, 115; 99/295, 99/323
See application file for complete search history.

(56) References Cited

U.S. PATENT DOCUMENTS 4,136,202 A    1/1979    Favre
5,013,569 A *  5/1991    Rubin ........................ 426/585
(Continued)

FOREIGN PATENT DOCUMENTS

EP    1654966    1/1979
EP    0199535    10/1986
(Continued)

OTHER PUBLICATIONS

International Search Report for International Application No. PCT/EP2009/050151 mailed on Apr. 23, 2009.
(Continued)

*Primary Examiner* — Drew Becker
*Assistant Examiner* — Luana Z Long
(74) *Attorney, Agent, or Firm* — K&L Gates LLP

(57) ABSTRACT

The invention proposes a capsule (9) for use in a beverage production device, the capsule containing ingredients for producing a nutritional liquid when a liquid is fed into the capsule (9) at an inlet face (8) thereof, the capsule (9) furthermore containing heat sensitive bioactive ingredients such as probiotic microorganisms (21) which are physically separated from the other nutritional ingredients in the capsule.

7 Claims, 7 Drawing Sheets

(51) Int. Cl.
  B65D 85/804  (2006.01)
  A23L 1/29    (2006.01)
  A23L 2/395   (2006.01)
  A23L 2/42    (2006.01)
  A23L 3/00    (2006.01)
  A47J 31/02   (2006.01)
  A47J 31/40   (2006.01)

(52) U.S. Cl.
  CPC ............. *A23L 1/3014* (2013.01); *A23L 2/395* (2013.01); *A23L 2/42* (2013.01); *A23L 3/001* (2013.01); *A47J 31/02* (2013.01); *A47J 31/407* (2013.01)

(56) References Cited

U.S. PATENT DOCUMENTS

| | | | |
|---|---|---|---|
| 5,681,468 | A | 10/1997 | Sawan et al. |
| 5,869,073 | A * | 2/1999 | Sawan et al. .................. 424/406 |
| 5,958,478 | A * | 9/1999 | Lehrer ............................ 426/77 |
| 6,758,130 | B2 * | 7/2004 | Sargent et al. ................... 99/295 |
| 6,841,181 | B2 | 1/2005 | Jager et al. |
| 7,469,628 | B2 * | 12/2008 | Mandralis et al. ............... 99/295 |
| 2001/0016220 | A1 * | 8/2001 | Jager et al. ...................... 426/98 |
| 2003/0005826 | A1 | 1/2003 | Sargent et al. |
| 2005/0255202 | A1 * | 11/2005 | Dalziel et al. ................. 426/302 |
| 2007/0031537 | A1 | 2/2007 | Secretin |
| 2007/0042101 | A1 | 2/2007 | Troplin et al. |
| 2010/0047394 | A1 * | 2/2010 | May ............................... 426/62 |
| 2010/0159109 | A1 * | 6/2010 | Van Puijenbroek et al. .. 426/594 |

FOREIGN PATENT DOCUMENTS

| | | | |
|---|---|---|---|
| EP | 0577903 | 1/1994 | |
| EP | 0768375 | 4/1997 | |
| EP | 1574452 | 9/2005 | |
| EP | 1472156 | 3/2006 | |
| EP | 1774878 | 4/2007 | |
| JP | 2001238641 | 9/2001 | |
| JP | 2001245660 | 9/2001 | |
| JP | 200553547 | 11/2005 | |
| JP | 2006009489 | 1/2006 | |
| JP | 2011502450 | 1/2011 | |
| WO | WO 97/00078 | 1/1997 | |
| WO | WO 00/53200 | 9/2000 | |
| WO | WO 2004/112507 | 12/2004 | |
| WO | 2006077259 | 7/2006 | |
| WO | WO 2006077259 A1 * | 7/2006 | ............... A23L 1/48 |
| WO | WO 2008/012314 | 1/2008 | |

OTHER PUBLICATIONS

Written Opinion for International Application No. PCT/EP2009/050151 mailed on Apr. 23, 2009.

S. Salminen, et al., "Probiotics: how should they be defined?," Trends in Food Science & Technology, vol. 10, 1999, pp. 107-110.

* cited by examiner

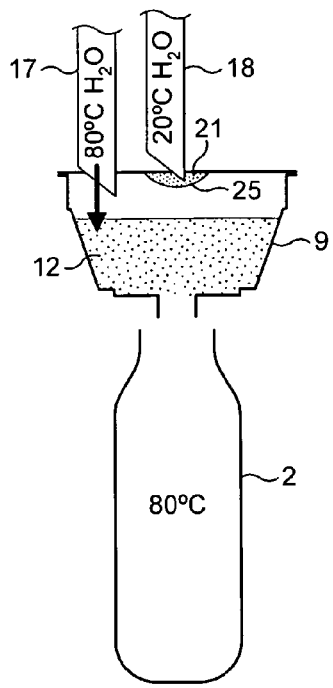
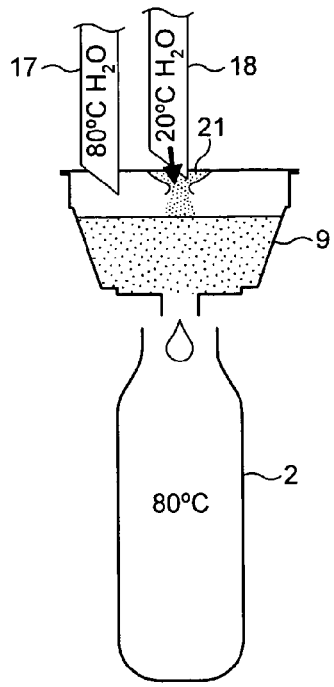
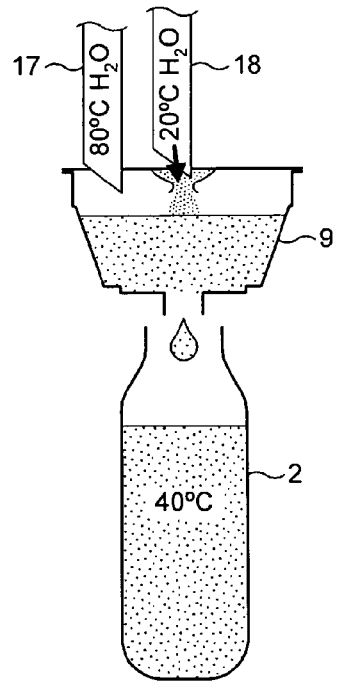
FIG. 6A     FIG. 6B     FIG. 6C
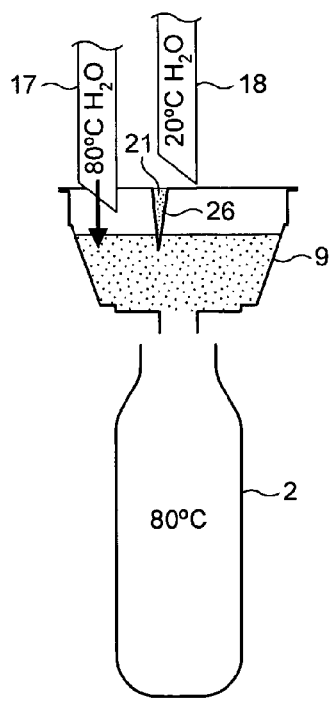
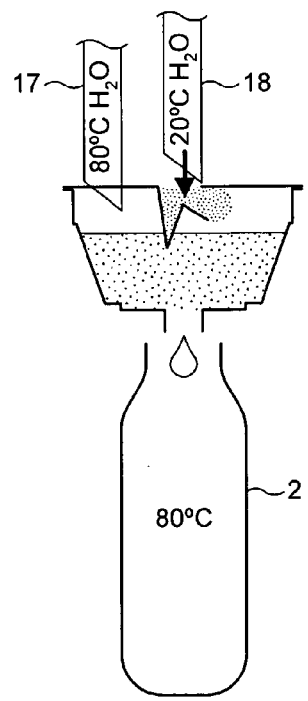
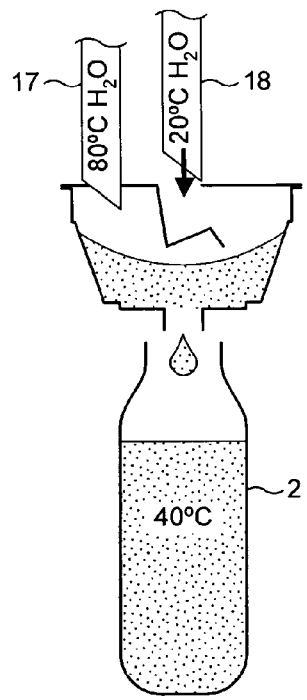
FIG. 7A     FIG. 7B     FIG. 7C

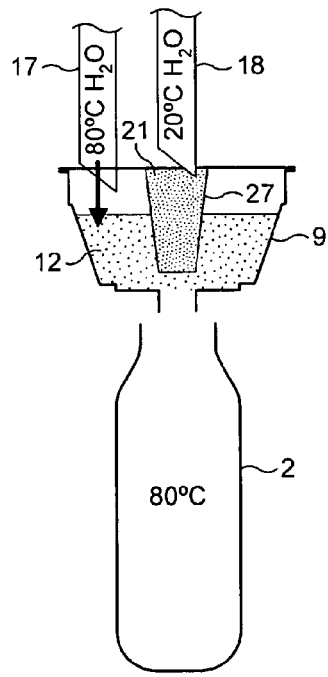 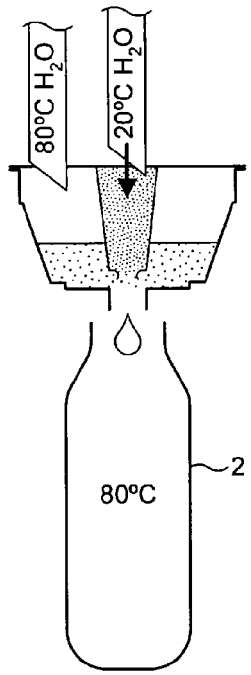 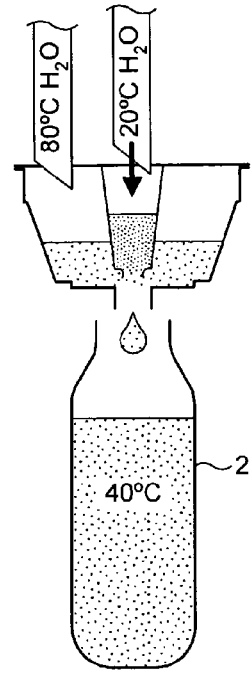
FIG. 8A    FIG. 8B    FIG. 8C
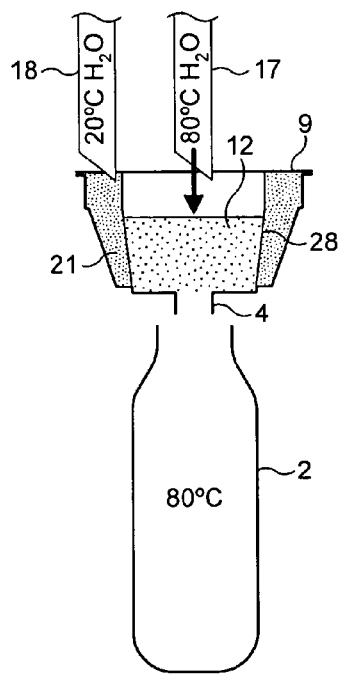 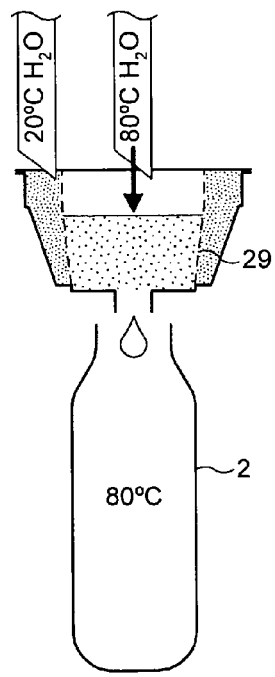 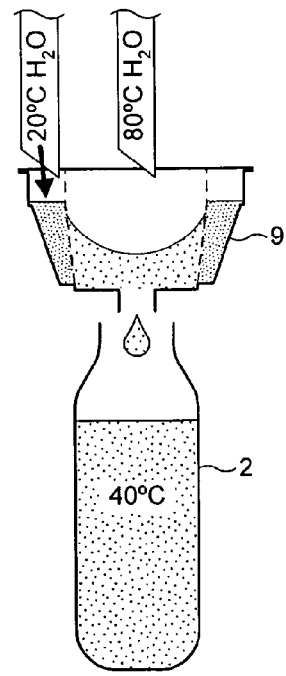
FIG. 9A    FIG. 9B    FIG. 9C

CAPSULE CONTAINING NUTRITIONAL INGREDIENTS AND METHOD OF DELIVERY OF A NUTRITIONAL LIQUID FROM THE CAPSULE

CROSS-REFERENCE TO RELATED APPLICATIONS

This application is a U.S. national stage filing of International Appl. No. PCT/EP2009/050151, filed Jan. 8, 2009, which claims priority to EP 08100901.1, filed on Jan. 24, 2008, the entire contents of which are expressly incorporated herein by reference thereto.

BACKGROUND

The present invention relates to the delivery of nutritional liquids such as baby milk from capsules, in particular, from nutritional ingredients including heat sensitive bioactive ingredients such as probiotic microorganisms and to a method for delivering such nutritional liquids from capsules.

Infant formulas have been developed as a substitute for human breast milk in order to provide required nutrients to infants. In general the infant formulas are either based on cow or soy milk and may be provided in different forms such as powder or concentrated liquid form.

If prepared and consumed in this manner, powdered infant formulas provide a safe and nutritionally good substitute for mother's milk in the situations described above. However, the process needs to be repeated every time a feed is required. It may readily be seen that this may not always be convenient and, as a consequence, many parents and other caregivers do not prepare the formulas properly and hence expose the infant to the risk of infection. For example, the water may not be boiled prior to use in which case any pathogens in the water are fed to the infant. Usually water sources in developed countries are reasonably safe but this may not be the case everywhere.

Alternatively, batches of the infant formula may be prepared and then stored until needed. Unfortunately, if any pathogen has contaminated the formula, it then has time to replicate, significantly increasing the risk of infection in the infant.

In further development, infant formulas in ready-to-feed single serve portions have been introduced which overcome the inconvenience of the preparation of the infant formula. However, these ready-to-feed products are more costly than infant formulas stored in bulk and there is the same need to consume the formula immediately after opening to avoid the risk of contamination with bacteria.

A device which teaches the principle of treating water by means of a filter used for the preparation of nutritional compositions in a dispenser from capsules is disclosed in co-pending European patent application No. 06117801.8 filed 25 Jul. 2006 entitled "Dispenser for preparing a nutritional composition".

In the recent past, certain strains of bacteria have attracted considerable attention because they have been found to exhibit valuable properties for man if ingested. In particular, specific strains of the genera Lactobacilli and Bifidobacteria have been found to be able to colonise the intestinal mucosa, to reduce the capability of pathogenic bacteria to adhere to the intestinal epithelium, to have immunomodulatory effects and to assist in the maintenance of well-being. Such bacteria are sometimes called probiotics.

Extensive studies have been carried out to identify new probiotic strains. For example, EP 0 199 535, EP 0 768 375, WO 97/00078, EP 0 577 903 and WO 00/53200 disclose specific strains of Lactobacilli and Bifidobacteria and their beneficial effects.

As far as infants specifically are concerned, immediately before birth, the gastro-intestinal tract of a baby is thought to be sterile. During the process of birth, it encounters bacteria from the digestive tract and skin of the mother and starts to become colonised. Large differences exist with respect to the composition of the gut microbiota in response to the infant's feeding. The fecal flora of breast-fed infants includes appreciable populations of Bifidobacteria with some *Lactobacillus* species, whereas formula-fed infants have more complex micro biota, with Bifidobacteria, Bacteroides, Clostridia and Streptococci all usually present. After weaning at about 2 years of age, a pattern of gut microbiota that resembles the adult pattern becomes established.

For this reason, it has been proposed to add probiotics to infant formulae to encourage gut colonization to take place and to promote colonization with the "good" bacteria—species of Bifidobacteria and Lactobacilli—rather than the harmful bacteria—pathogens such as clostridia.

For instance, WO 2004/112507 relates to infant or follow-on formula comprising a source of proteins, a source of lipids, a source of carbohydrates and a probiotic.

As of today, no convenient solution has been proposed for the delivery in a convenient and safe manner, nutritional liquids prepared from single-use capsules processed in a beverage production device; said capsule including certain heat sensitive bioactive ingredients such as probiotics or certain heat sensitive polypeptides or glycoproteins.

One problem with the reconstitution in a capsule of a nutritional liquid containing such bioactive ingredients is that by introducing hot liquid into the capsule to ensure a sufficient level of food safety, e.g. to kill non-desirable microorganisms, the heat sensitive bioactive ingredients are also incidentally degraded or deactivated (e.g. probiotics killed). Therefore, the nutritional liquid no longer delivers the full health or immune benefits intended.

Furthermore, there is a need to ensure that non-desirable bacteria or yeast cannot be delivered in the nutritional liquid, whereas the desired bioactive ingredients, e.g., probiotics, are maintained in an optimal bioactive state when they are delivered in said liquid.

SUMMARY

Therefore, it is an object of the present invention to propose a solution for improving the health benefit of a nutritional liquid by successfully and in a safe manner delivering from a single-use capsule a nutritional liquid containing heat-sensitive bioactive ingredients which are not deteriorated, retained within the capsule or otherwise affected in their bio-efficiency during reconstitution and delivery of the liquid from the capsule, while including in the reconstitution a heating step to inactivate undesirable micro-organisms or a filtration step to remove said undesirable microorganisms.

This object is achieved by means of the features of the independent claims. The depending claims develop further the central idea of the present invention.

A first aspect of the invention relates to a capsule for use in a beverage production device. The capsule contains ingredients for producing a nutritional liquid when a liquid is fed into the capsule at an inlet face. The capsule additionally contains heat sensitive bioactive ingredients which are physically separated in the capsule from at least a portion of the other nutritional ingredients.

The term "heat sensitive bioactive ingredients" refers to any food ingredient providing nutritional, health or immune benefits for which the bioactivity would be significantly reduced, degraded or lost when contacted by a hot liquid of a temperature sufficient to inactivate undesirable microorganisms during reconstitution of a nutritional beverage, for example at temperatures above 70° C., more preferably at temperatures above 80° C.

In a preferred mode of the invention, the heat sensitive bioactive ingredients are probiotic microorganisms ("probiotics").

Probiotics are defined as microbial cell preparations or components of microbial cells with a beneficial effect on the health or well-being of the host. (Salminen S, Ouwehand A. Benno Y. et al "Probiotics: how should they be defined" Trend Food Sci. Technol. 1999: 10 107-10).

The probiotics may be mixed with prebiotics, which are non-digestible food ingredients that beneficially affect the host by selectively stimulating the growth and/or activity of one or a limited number of bacteria in the colon, and thus improve host's health. Prebiotics may be also stored separately from the probiotics.

Other heat sensitive bioactive ingredients are biologically active proteins, peptides and fat. More preferably, the ingredients are lactoferrin, immunoglobulins, milk fat globule membrane fractions (MFGM), growth factors such as TGF-beta, DHA (Docosahexaenoic acid), DGLA (Dihomo-y-linolenic acid) and combinations thereof.

The probiotic microorganisms and other heat sensitive bioactive ingredients are preferably physically separated from at least a part of the remaining ingredients. This is of importance when the ingredients potentially contain non-desirable microorganisms which should be withheld from the produced nutritional liquid (e.g. by filtering) or killed (by temperature, antimicrobial agents etc.) without decreasing unduly the number of colony forming units (CFU) of probiotics in the produced nutritional liquid.

The physical separation between the heat sensitive bioactive ingredients and the other ingredients may be achieved by means of a wall permeable to a liquid or a wall impermeable to a liquid or by means of encapsulation of the heat sensitive bioactive ingredients, in particular, of the probiotic microorganisms.

In another aspect of the invention which may be combined or be treated independently from the first aspect as aforementioned, the invention relates to a capsule containing ingredients for producing a nutritional liquid when a liquid is fed into the capsule at an inlet face. The capsule additionally contains probiotic microorganisms and an antimicrobial filter. More particularly, the antimicrobial filter is placed in the capsule upstream of the probiotic microorganisms. The antimicrobial filter can also be placed upstream of all the ingredients and containing the probiotics.

In a further aspect, the separation wall can be the antimicrobial filter. In this case, the heat sensitive bioactive ingredients, e.g., probiotic microorganisms, are placed in the capsule downstream of the antimicrobial filter between the filter and the outlet of the capsule. The other ingredients, e.g., proteins and carbohydrates, vitamins, minerals, etc., capable of being filtered through the filter in the mixed liquid, can be so placed upstream of the antimicrobial filter. As a result, only non-desirable microorganisms contained in water and/or in the upstream part of the ingredients are stopped by the antimicrobial filter whereas the probiotic microorganisms can be delivered successfully without being stopped by the antimicrobial filter.

In a possible mode, the compartment placed downstream of the antimicrobial filter relative to the flow of liquid and containing the probiotic microorganisms also contains encapsulated fat. The fat may be plant fat or a mixture of plant and milk fat or a mixture of plant fat and milk fat plus other fat coming from other sources such as LC-PUFA. The fat can so be dissolved by water passing through the downstream compartment and this avoids the problem of fat droplets (typically of a size between 0.05-10 microns for a well emulsified liquid) to become blocked at the antimicrobial filter and consequently blocking the liquid flow in the capsule.

In another aspect, the probiotics microorganisms and all the other nutritional ingredients are placed in the same compartment of the capsule, i.e., in the main mixing chamber. The antimicrobial filter is placed between the inlet face of the capsule and the compartment containing the ingredients including the probiotic microorganisms. As a result of the presence of the antimicrobial filter, the water introduced in the compartment is removed from non-desirable microorganisms by the filter contained in the capsule and can be heated at a temperature which does not degrade or kill the probiotics microorganisms, e.g., lower than 45° C., contained in the capsule. Preferably, the antimicrobial filter is placed at a certain distance from the inlet face to enable the insertion of a liquid injecting means through the inlet face without damaging the filter.

The antimicrobial filter can have a pore size of less than 1 μm, preferably less than 0.5 μm, even more preferred less than 0.3 μm.

Preferably the probiotic microorganisms are arranged between the antimicrobial filter and an outlet of the capsule.

The separation wall can separate at least two compartments inside the capsule.

The separation wall may extend transversally across the flow path of the liquid moving from the inlet face to the outlet face of the capsule, through the capsule.

In an alternative, the separation wall may extend longitudinally in the capsule in the direction of the flow path in the capsule from the inlet face to the outlet face.

The ingredients can comprise an infant formula in the form of a powder or a liquid concentrate.

The probiotic microorganisms can be present as a dry powder (spray dried or freeze dried).

The probiotic microorganisms can be provided as a gel, in a compressed form such as e.g. a pellet or tablet, or as capsules.

The probiotic microorganisms can comprise bacteria and/or yeasts.

All probiotic micro-organisms may be used in accordance with the present invention. Preferably, the probiotic may be selected from the group consisting of *Bifidobacterium, Lactobacillus, Lactococcus, Enterococcus, Streptococcus Ascomycota, Deuteromycota, Debaryomyces, Kluyveromyces, Saccharoymces, Yarrowia, Zygosaccharomyces, Candida*, and *Rhodotorula*, in particular selected from the group consisting of *Bifidobacterium longum, Bifidobacterium lactis, Bifidobacterium animalis, Bifidobacterium breve, Bifidobacterium infantis, Lactobacillus acidophilus, Lactobacillus casei, Lactobacillus salivarius, Lactococcus lactis, Lactobacillus reuteri, Lactobacillus rhamnosus, Lactobacillus paracasei, Lactobacillus johnsonii, Lactobacillus plantarum, Lactobacillus salivarius, Enterococcus faecium, Saccharomyces cerevisia, Saccharomyces boulardii* and *Lactobacillus reuteri* or mixtures thereof, preferably selected from the group consisting of *Lactobacillus johnsonii* (NCC533; CNCM I-1225), *Bifidobacterium longum* (NCC490; CNCM I-2170), *Bifidobacterium longum* (NCC2705; CNCM I-2618), *Bifidobacterium lactis* (2818; CNCM I-3446), *Lactobacillus paracasei* (NCC2461; CNCM I-2116), *Lactobacillus rhamnosus* GG (ATCC53103), *Lactobacillus rhamnosus* (NCC4007; CGMCC 1.3724), *Enterococcus faecium* SF 68 (NCIMB10415), and mixtures thereof.

In a possible mode of the invention, at least two different probiotics are present. One particularly preferred combination is a *Lactobacillus* such as a *Lactobacillus rhamnosus* or *Lactobacillus paracasei* species for example and a *Bifidobacterium* such as a *Bifidobacterium lactis, Bifidobacterium longum, Bifidobacterium breve* or *Bifidobacterium animalis* species for example. Examples of such combinations of strains are *Bifidobacterium longum* ATCC BAA-999 with *Lactobacillus rhamnosus* ATCC 53103, *Lactobacillus paracasei* CNCM I-2116 or *Lactobacillus rhamnosus* CGMCC 1.3724. Another particularly preferred combination is two *Bifidobacterium* strains. One example of such a combination is *Bifidobacterium longum* ATCC BAA-999 with *Bifidobacterium lactis* CNCM I-3446.

An example of a probiotic yeast is e.g. *Saccharomyces cerevisiae*, esp. *Saccharomyces boulardii*.

The capsule may contain between $1*10^2$ and $1*10^{12}$ CFU of probiotic microorganisms.

The probiotic microorganisms or other heat sensitive bioactive ingredients can be contained in a compartment which is mechanically associated with the inlet face of the capsule.

The probiotic microorganisms or other heat sensitive bioactive ingredients can be contained in a compartment which is mechanically associated with an outlet face of the capsule.

The probiotic microorganisms or other heat sensitive bioactive ingredients can be separated radially inside or outside of the ingredients in a top view of the capsule.

The main nutritional ingredients contained in the capsule which are maintained separated from the heat sensitive bioactive ingredients include more particularly:
- at least a source of proteins and
- at least a source of carbohydrates.

Additionally, the main ingredients comprise a source of lipids and micronutrients.

In particular, for infant formulae, the source of proteins preferably comprises whey and casein chosen in a range comprised between 100:0 to 40:60. The whey proteins may be modified sweet whey. Sweet whey is a readily available by-product of cheese making and is frequently used in the manufacture of infant formulae based on cows' milk.

The proteins may be intact or hydrolysed or a mixture of intact and hydrolysed proteins. Of course, other proteins of animal or vegetable origin can be used such as soy proteins depending on the category of person (infant, toddler, elderly persons, patients, etc.) to be fed.

Preferred carbohydrate sources are lactose, saccharose, maltodextrin, starch and mixtures thereof.

Either the carbohydrate content or the lipid content of the formulae may also vary as a function of the age of the infant and preferably both the carbohydrate content and the lipid content will so vary. Generally speaking, the carbohydrate content may increase with increasing age of the infant for example from 9.0 to 12.0 g carbohydrate/100 kcal, preferably from 10.1 to 11.6 g carbohydrate/100 kcal and the lipid content may decrease with increasing age of the infant, for example from 6.0 to 4.5 g lipid/100 kcal, preferably from 5.6 to 5.1 g lipid/100 kcal.

Preferred lipid sources include milk fat, palm oil, palm olein, sunflower oil, corn oil, coconut oil, low-erucic rapeseed (canola) oil, high oleic sunflower oil and high oleic safflower oil and combinations thereof. The essential fatty acids linoleic and α-linolenic acid may also be added as small amounts of oils containing high quantities of pre-formed arachidonic acid and docosahexaenoic acid such as fish oils or microbial oils. The lipid source preferably has a ratio of n-6 to n-3 fatty acids of about 5:1 to about 15:1; for example about 8:1 to about 10:1.

When an antimicrobial filter is present in the capsule, the lipid ingredients capable of forming large fat droplets in the emulsified liquid can be combined with the separated heat sensitive bioactive ingredients. Indeed, large fat droplets suspended in the reconstituted liquid can be retained and accumulate on the filter membrane, potentially creating clogging problems. Furthermore, the fat and/or probiotics can be further encapsulated to prevent negative interactions during storage and to promote dissolution and emulsion formation in the nutritional beverage.

Examples of micronutrients are all vitamins, minerals or other nutrients understood to be essential in the daily diet and in nutritionally significant amounts. Examples of minerals, vitamins and other nutrients optionally present in the infant formula include vitamin A, vitamin $B_1$, vitamin $B_2$, vitamin $B_6$, vitamin $B_{12}$, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. The minerals are usually added in salt form. The presence and amounts of specific minerals and other vitamins will vary depending on the intended population.

A further aspect of the invention relates to a beverage production machine for producing a nutritional liquid from ingredients contained in the capsule,
the machine comprising
   means for heating a liquid, and
   means for feeding the heated liquid into the capsule,
wherein the machine is designed to feed in parallel at least two separate liquid streams having differing temperatures into a single capsule housed in the machine.

Thereby one liquid stream may have a temperature of at least 70° C., and the other liquid stream can have a temperature of less than 30° C.

The temperatures and volumes of the two liquid streams can be set such that a mixing thereof results in a liquid having a temperature between 30° C. and 50° C., preferably between 35° C. and 45° C.

A still further aspect of the invention relates to a beverage production system,
comprising a capsule as set forth above and a beverage production machine having:
   means for housing the capsule, and
   means for supplying a liquid to the capsule and optionally
      means for subsequently feeding a gas (air, nitrogen, . . . ) to empty the capsule from liquid residue.

The beverage production machine can furthermore comprise:
   means for opening an inlet face of the capsule.

The beverage production machine may be designed such that the beverage produced in the capsule can be obtained from the capsule without the beverage contacting a part of the beverage production machine.

A still further aspect of the present invention relates to a method for producing and delivering a nutritional liquid in a beverage production machine from ingredients including heat sensitive bioactive ingredients, e.g., probiotics, contained in a capsule,
the machine comprising the steps of heating a liquid in the machine and injecting the heated liquid into the capsule and wherein the injection step comprises injecting sequentially or in parallel at least two separate liquid streams having differing temperatures into a single capsule housed in the machine.

In particular, the method includes the step of injecting a liquid stream of lower temperature into a compartment containing the heat sensitive bioactive ingredients, e.g., probiotics, and a liquid stream of higher temperature in a compartment containing the other ingredients. Therefore, the viability or bio-efficiency of the heat sensitive bioactive ingredients can be preserved in the dispensed liquid whereas a sufficiently hot liquid still interacts with the other ingredients for ensuring heat treatment of the ingredients, a better dissolution or mixing and the setting of the desired final (e.g., warm) temperature of the liquid.

In the step of injecting the liquid streams in parallel, the liquid streams are injected into two separate compartments of the capsule.

In the step of injecting the liquid streams sequentially, the liquid streams are injected into the same or separate compartments.

The method can further comprise a subsequent step of injecting a gas under pressure, preferably compressed air, to completely empty the capsule after injection of the heated liquid into the capsule is stopped. This operation ensures that the capsule is emptied of residual liquid. As a result, the operation is cleaner and more hygienic since there is less or no dripping when the capsule is removed from the device. The capsule is also more environmentally friendly and can be incinerated or recycled more easily.

Further features, advantages and objects of the present invention will become evident when going through the following detailed description of preferred embodiments of the invention.

BRIEF DESCRIPTION OF THE FIGURES

FIGS. 6A, 6B and 6C show an embodiment of a capsule in which probiotics are affixed to the inlet face of the capsule, FIGS. 7A, 7B and 7C show an embodiment of a capsule in which probiotics are provided in a layered support, FIGS. 8A, 8B and 8C show an embodiment of a capsule in which probiotics are provided in a center compartment, FIGS. 9A, 9B and 9C show an embodiment of a capsule in which probiotics are provided in an outer compartment surrounding other nutritional ingredients.

DETAILED DESCRIPTION

Figure 1:
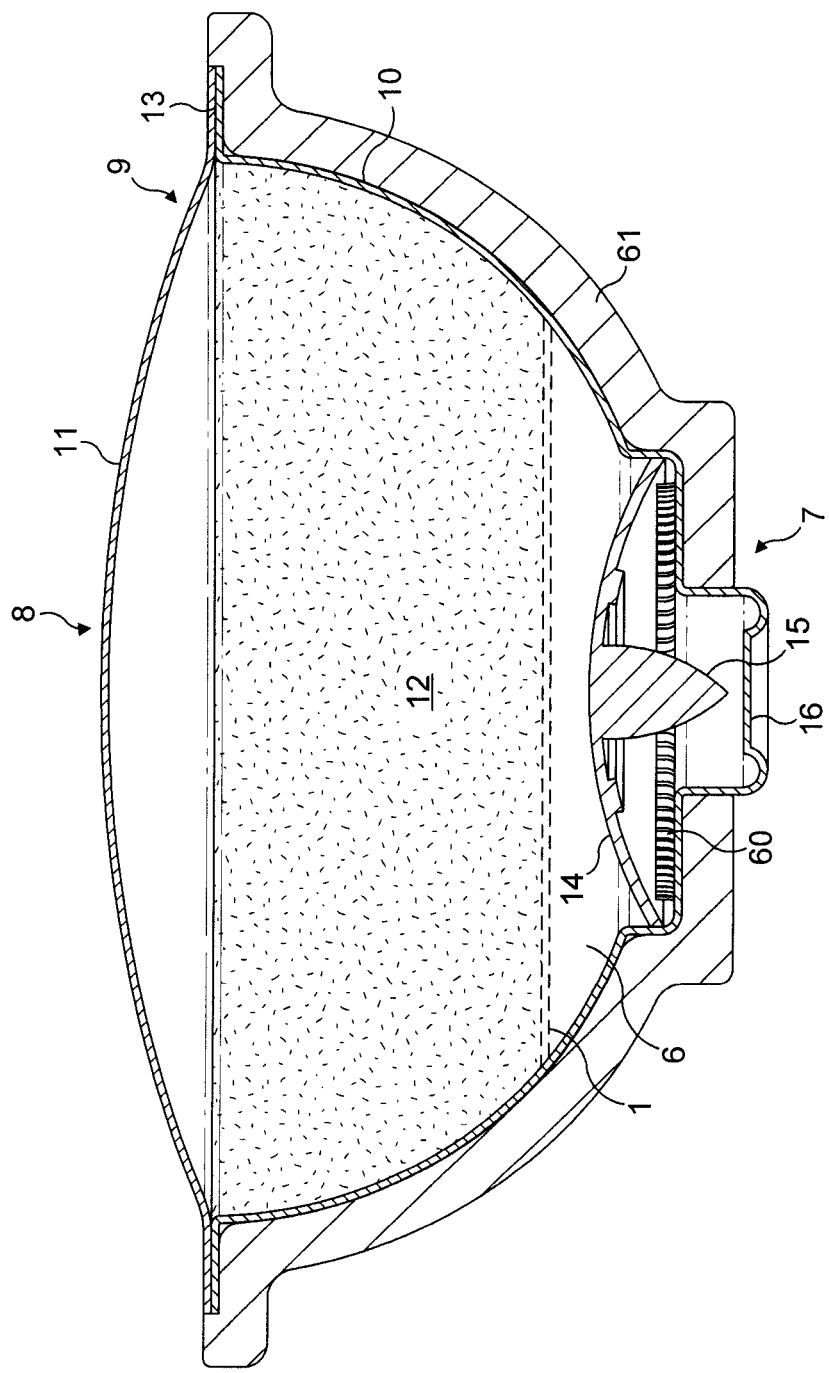
FIG. 1 shows an example of capsule according to the present invention as placed in a capsule holder of a beverage preparation device, FIGS. 2A*a* and 2B shows schematically a capsule having an antimicrobial filter in an outlet opening of the capsule.

Generally the present invention proposes to have both macronutrient ingredients and heat sensitive ingredients such as probiotics and optionally prebiotics in a capsule. Thereby the probiotics can be provided in the capsule in an arrangement allowing either killing of non-desirable microorganisms in the other ingredients and/or water (e.g. by a high temperature) or withholding them in the capsule (e.g. by mechanical filtering). At the same time the CFU count of the probiotics (being live or viable microorganisms) or the bioactivity of other heat-sensitive bioactive ingredients in the capsule should not be reduced unduly by this killing or filtering action.

To start with, an antimicrobial filter in a capsule will be described, which can be used in combinations with probiotics.

The term "antimicrobial filter" designates a filter which, through a mechanical filtering or other contaminant removing action significantly reduces the number of living microorganisms, such as e.g. bacteria, at the down stream side of the filter. The same term also encompasses different possible filtration media such as micro-porous membranes or adsorbent substrates for binding the microorganisms or rendering them otherwise inert.

The invention generally relates to capsules which contain beverage or food ingredients and is particularly adapted for capsules containing infant formulae comprising nutritional ingredients including: proteins such as whey and casein, lipids such as milk or vegetable fat and a source of carbohydrates such as lactose, saccharose and/or maltodextrin, and micronutrients.

Preferably such capsules according to the present invention are sealed at a production site after having preferably been flushed by a protective gas such as nitrogen, and are opened once they have been placed in an associate beverage or liquid comestible production machine. Preferably the opening of the capsules is not done manually, but by a sanitized part of the associated beverage production machine and/or an internal mechanism of the capsule. This opening technique reduces the risks of a contamination of the interior of the capsule.

The capsule will be supplied manually or in an automated fashion to a chamber of the beverage production machine. The capsule is held in a defined position in the chamber. The liquid supply to the interior of the capsule and the draining of the nutritional liquid from the capsule is usually carried out while the capsule remains fixed in the chamber.

The production of the nutritional liquid can be based on a wide range of liquid-ingredient interaction, such as e.g. dissolution, brewing, extraction, mixing, suspension etc. Dissolution and suspension are preferred in case of infant formulas being present as powder, granular, flaked or liquid concentrate ingredients inside the capsule.

Preferably the capsules will be opened at an inlet face thereof by associated opening means such as perforation means of the machine. On the other hand, at the outlet face of the capsules an opening can be produced either by integrated opening means of the capsule or by associated opening means being part of the beverage production machine. The opening means can be means of perforation of a face of the capsule or can be a valve (e.g., a silicone septum).

A particular opening mechanism is to thrust a face of the capsule to be opened against integrated or external perforation means by a pressure built up in the interior of the capsule. This pressure built up can e.g. be caused by injecting a liquid, such as e.g. water through the inlet face of the capsule into the capsule.

Preferably the integrated opening mechanism is used, which will be explained via the embodiment of FIG. 1. This internal mechanism is particularly used for so-called "direct flow" capsules, in which the produced liquid can be obtained from the capsule without the produced liquid being in contact with parts of the beverage production machine. This obviously reduces the risk of a contamination of the beverage after it has been reduced in the capsule via an interaction between the injected liquid and the ingredients contained in the capsule.

An example of a closed capsule with integrated opening means will now be shortly explained with reference to FIG. 1 of the enclosed drawings.

FIG. 1 shows a capsule 9 comprising a cup shaped base body 10, which is form stable and e.g. made from plastics, and the lid membrane 11 welded at the peripheral welding edge 13 forming the periphery of said cup shaped base body 10. The lid membrane 11 can be made e.g. from a sandwich or metallic foil. The reference numeral 12 generally designates the ingredients placed in the chamber upstream of the filter 1. The system for opening the capsule according to this embodiment consists of a disc 14 arranged in the bottom of the cup shaped base body 10 and comprises a puncturing member 15. The puncturing member 15 is enclosed in the chamber formed by the cup shaped base body 10 and the lid membrane 11. The disc is thus arranged at the bottom of the cup and thus forms a wider area over which the internal pressure may be spread during extraction. A second chamber 6 is defined by the antimicrobial filter 1 and the disc 14. The second chamber can contain heat sensitive bioactive ingredients such as probiotic microorganisms. The second chamber can be of a smaller volume than the first chamber 12. At the time of extraction, the capsule is introduced into the beverage production machine, i.e. in the capsule holder 61 of the machine, water is introduced via a needle (not shown) which perforates the membrane 11, and under the effect of the rise and pressure in the capsule 9, the disc 14 experiences a downward thrusting force towards the retaining part or outlet puncturable wall 16, such that the piercing member 15 opens the retaining part 16 of the cup shaped base body 10, thus allowing the beverage produced inside the capsule 9 to be drained via one or more holes in the perforated wall 16. It should be noted that a second chamber for the heat sensitive bioactive ingredients could also be formed in the space formed between the disc 14 and the lower wall 16.

In other embodiments of the capsule, the disc 14 can be placed outside the chamber and below the outlet puncturable wall 16 with its piercing member turned upwards and acting to thrust the wall 16 by an upward thrusting force toward the wall. In this case the puncturable wall can be a puncturable membrane which is sealed internally along a peripheral edge of the cup shaped base. The cup shaped base can thus have an open lower outlet for guiding the liquid that is discharged from the capsule. Such embodiments are described in detail in reference to FIGS. 6 to 13 of EP1472156, in particular.

The reference numeral 1 in FIG. 1 designates a antimicrobial or antimicrobial filter according to the present invention.

As can be seen in FIG. 1, this filter is arranged between at least a part of the ingredients 12 and the outlet opening 16 of the capsule 9.

Preferably the antimicrobial filter can present a nominal pore size of 1 µm or less, more preferred 0.5 µm or less, such as for example 0.2 µm.

Preferably the filter 1 is a membrane filter which is sometimes also called "micro porous filter". E.g. the filter can be made from thin layers of polymer and can have a thickness of less than 500 µm, preferably 10 to 300 µm.

Preferably the antimicrobial filter 1 has a high porosity (e.g. up to 70-90% of the total filter surface) in order to not unduly hinder the flow of the liquid across the filter 1.

The antimicrobial filter 1 can preferably be used together with a capsule containing milk powder and/or other infant formula components which are prone to bacterial contamination.

With reference to FIGS. 2A-2B and 3A-3B now further embodiments of the invention will be explained. The arrow referenced with the numeral 3 designates the incoming stream of a liquid, such as for example water on the inlet side (top side) of the capsule 9. Reference 17 designates means for perforating the inlet face of the capsule and supplying a liquid, which can be e.g. a pressurized hot liquid, preferably water.

FIGS. 2A-2B and 3A-3B show the principle of the invention in a more schematic form of the capsule, i.e., without explicitly showing the opening mode of the capsule as aforementioned.

Figure 2A:
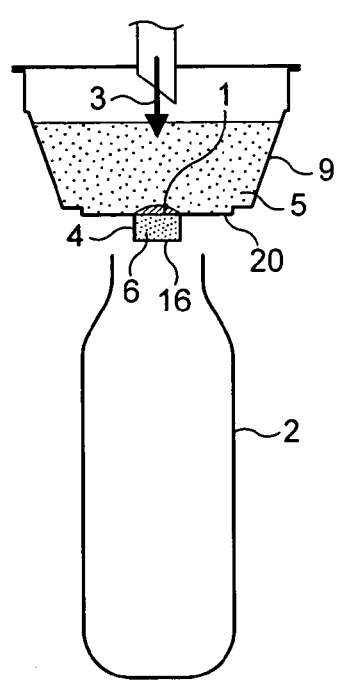
Figure 2B:
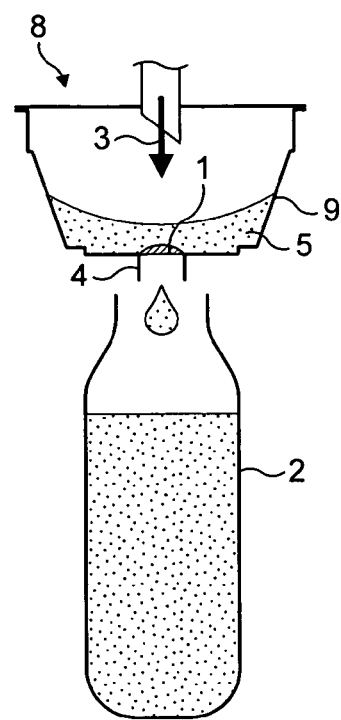

In the embodiment of FIGS. 2A-2B the antimicrobial filter 1 is arranged in an outlet spout 4 of the capsule 9. In this case there can be only one main compartment 5 in the capsule at least partially filled with beverage ingredients. Below the filter 1, the spout comprises a tubular reservoir which contains the heat sensitive bioactive ingredients, in a particular, probiotics 6. The reservoir can be sealed by a lower membrane 16 which is perforated before use or break or is perforated by effect of the liquid under pressure in the capsule.

The pressure of the injected liquid 3 is sufficient in order to thrust the beverage produced by the interaction of the liquid 3 with the ingredients in the compartment 5 through the filter 1.

Figure 3A:
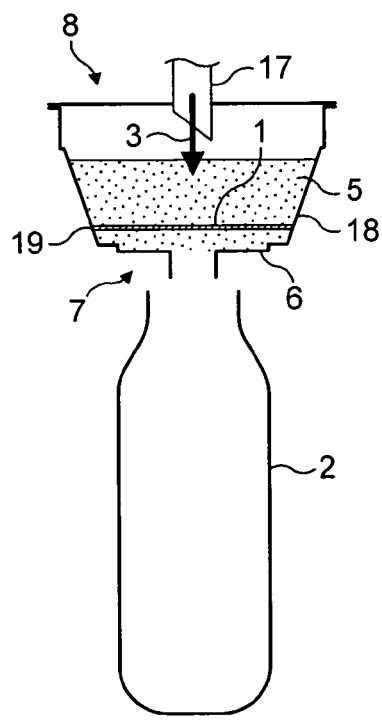
FIGS. 3A and 3B show schematically shows a capsule having an antimicrobial filter in the main compartment of the capsule, the filter defining a further compartment containing probiotics.
Figure 3B:
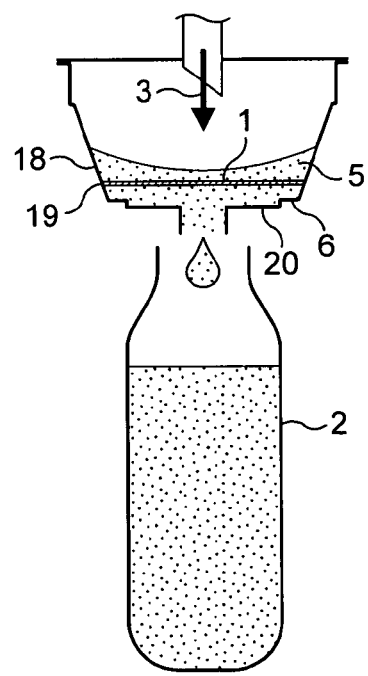

As shown in FIGS. 2B and 3B, the produced liquid can then directly flow (e.g. drop) into a baby bottle 2 placed under the outlet face of the capsule 9.

In the embodiment of FIGS. 3A-3B the antimicrobial filter 1 is arranged such that between the outlet spout 4 of the capsule 9 and the main compartment 5 for ingredients a second compartment 6 is produced. If necessary, this second compartment 6 can also be at least partially filled with ingredients and especially with ingredients which are not or less prone to bacterial contamination in comparison to the ingredients in the compartment 5.

The antimicrobial filter 1 in the embodiment of FIGS. 3A-3B completely traverses the interior of the capsule 9, while the antimicrobial filter 1 in the embodiment of FIG. 2 extends only partially over the cross-sectional surface (when seen from above) of the interior of the capsule 9.

In the embodiment of FIGS. 3A-3B, the antimicrobial filter is distanced from the bottom 20 of the capsule 9. In that case, it is preferably to have a backing wall to support the filter membrane and prevent it from tearing under the pressure of liquid in the capsule. A backing wall may be a grid of plastic or metal, for instance, placed below the filter membrane.

It is to be noted that the antimicrobial filter 1 can also be placed on the bottom 20 of the capsule 9 and can cover completely or partially the bottom 20. The antimicrobial filter 1 can be sealed to the bottom 20 over its entire surface or only partially, such as e.g. at its rim portion.

The antimicrobial filter 1 is preferably fixed (e.g. sealed at 19) to the inner side of the walls 18 of the capsule 9. The sealing 19 can be done e.g. via ultrasonic welding, gluing, press-fitting etc. The sealing guarantees that no beverage can flow between a potential gap between the filter 1 and the inner side of the walls of the capsule 9.

As it becomes clear from FIGS. 3A-3B, any ingredient housed in the second compartment 6, i.e. downstream of the filter 1, will not be filtered by the antimicrobial filter and will then reach the receptacle (bottle) 2 without filtering.

Note that the antimicrobial filter 1 can also be placed above the main compartment 5 of the capsule near the lid membrane. In this case, the compartment 5 contains all the ingredients including the heat sensitive bioactive ingredients.

According to the invention the probiotic microorganisms are preferably kept in a viable state in a condition with reduced $a_w$ (water activity) during storage in the capsule. Typically, the probiotic microorganisms are processed to form powder by freeze drying or spray drying (EP0818529).

Figure 4A:
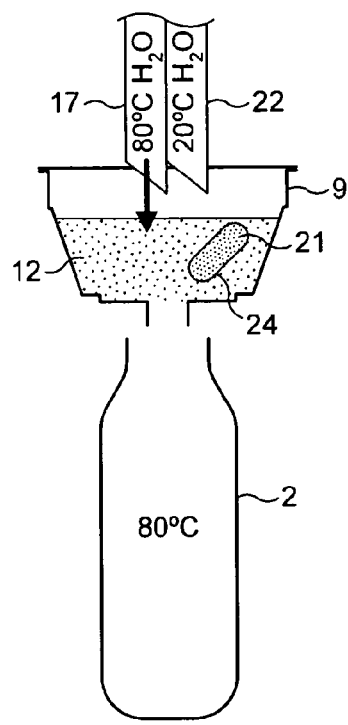
FIGS. 4A, 4B and 4C show an embodiment with encapsulated or micro-encapsulated probiotics.
Figure 4B:
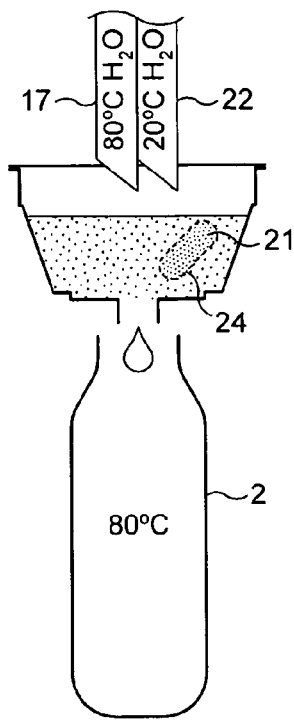
Figure 4C:
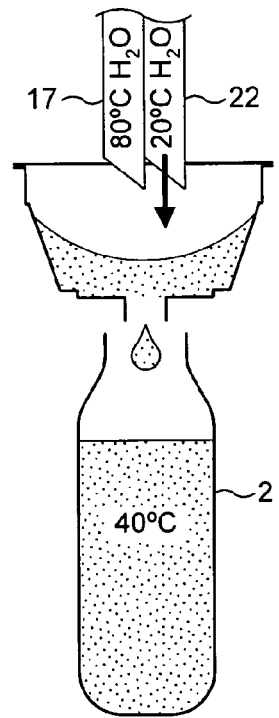

FIGS. 4A-4C show a further embodiment as how to provide probiotic microorganisms 21 in the capsule 9 of the invention. In this embodiment the probiotics 21 are encapsulated in capsules 24, i.e. surrounded by a sealed encapsulating wall 24. The capsule may be formed of a material which degrades in presence of hot liquid.

The encapsulation of probiotics is essentially a macro-encapsulation; the size of which being in the order of millimeter(s) to adequately protect the probiotics from the moist heat of the hot dissolving liquid.

FIGS. 4A-4C show a further aspect of the present invention, which results in the sequential or preferably parallel independent supply of two liquid streams 17, 22 to the interior or the capsule 9. These liquid streams have different temperatures, for instance, of 20° C. and 80° C., respectively. When using this independent parallel or time sequential feeding of liquids with different temperatures to the interior of the capsule 9, to start with, the high temperature stream will be supplied to the interior which leads to an interaction of this high temperature liquid with the nutritional ingredients 12. Over time this high temperature liquid in the interior of the capsule 9 will also lead to a degradation (e.g., solubilization or dispersion) or perforation of the encapsulation wall 24 encasing the probiotic microorganisms 21.

As illustrated in FIGS. 4A-4C, when the encapsulation wall 24 will have disappeared or will be at least permeable, the low temperature injection 22 starts in order to flush the probiotic microorganisms 21 in this low temperature environment to the receptacle 2, where this low temperature liquid with the dispersed microorganisms will be mixed with the already present high temperature nutritional liquid.

The temperatures and the volumes of the high temperature and low temperature liquid supplies, respectively, will be set such that the resulting mixed nutritional liquid with incorporated probiotics will be in the order of e.g. between 30° C. and 50° C. such that it is readily consumable e.g. by a child.

Although in FIGS. 4A-4C, the supply of two different liquid streams having different temperatures is shown as separate independent supplies 17, 22, it is to be understood that a single liquid supply can be controlled such that in a first stage a first liquid stream with a first temperature is supplied to the interior of the capsule 9 and in a second stage the second liquid stream having a different temperature is supplied to the interior of the capsule 9. This can be done e.g. by a control circuitry controlling heating means for the supplied liquid as well as e.g. a pump for delivering (e.g. pressurized) liquid to the capsule 9.

Figure 5:
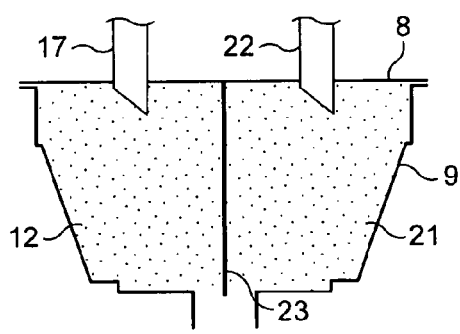
FIG. 5 shows a split-compartment capsule containing probiotics in one compartment thereof.

In the embodiment of FIG. 5 a vertical separation wall 23 is provided inside the capsule separating the nutritional ingredients 12 from the probiotic microorganisms 21.

In this case low temperature injection 22 of a liquid into the compartment for the probiotics 21 can be carried out at the same time as the high temperature injection 17 into the compartment having the other nutritional ingredients 12. The compartment wall 23 can be totally impermeable to liquids and therefore insulates the compartment containing probiotics enough to avoid the probiotics to be in contact with high temperature liquid.

FIGS. 6A-6C show an embodiment in which the probiotics 21 are contained in a compartment affixed to the top face of the capsule 9. Probiotics can e.g. be incorporated in a soft membrane 25.

Again, preferably first liquid injection means 17 are designed to inject a high temperature liquid in the main compartment having the nutritional ingredients 12, while at the same time, a second liquid injection means 18 injects a lower temperature liquid in the central compartment closed by the membrane 25 where the probiotics are arranged.

The high temperature injection liquid by injection means 17 will destroy any non-desired microorganisms eventually present in the ingredients 12, which can be e.g. instant formula powder ingredients such as milk powder. In the case, via the high temperature injection 17 the milk powder will be dissolved.

The low temperature injection liquid introduced by injection means 18 will break the membrane in the centre of the capsule and will release the probiotics in the capsule.

The probiotics will be conveyed to the receptacle 2 together with the low temperature liquid e.g. water having a temperature of 20° C. Again, in the receptacle 2 resulting mixed liquid will be present with the desired (consumable) temperature.

In particular, the injection of the high temperature liquid can be carried out before the injection of the low temperature liquid for a sequential release of the ingredients mixed with liquid through the capsule. In this case, the probiotics are never placed in contact with high temperature liquid which so ensures the full integrity of the probiotics when delivered from the capsule.

FIGS. 7A-7C show an embodiment of a capsule according to the present invention in which the probiotics 21 are provided in a layer support 26.

Again, the high temperature injection 17 (off centre) will kill the pathogens in the ingredients 12 and will lead to a dissolution of these ingredients 12, which can be e.g. an instant formula powder such as milk powder.

The low temperature injection 18 in the centre area of the capsule 9 will open the layer structure 26, i.e. the layer structure 26 is forced to open and to release the probiotics 21.

Again, the probiotics will be conveyed into the receptacle 2 together with the low temperature liquid.

FIGS. 8A-8C show an example in which the probiotics 21 are provided in a central compartment 27 of the capsule 9, which central compartment 27 is surrounded by the main compartment of the capsule 9, which main compartment contains nutritional ingredients.

Again, the low temperature injection is carried out in the central area and thus into the compartment for the probiotics 21. The probiotics will be conveyed to the receptacle 2 together with the centrally injected low temperature liquid.

FIGS. 9A-9C show an embodiment in which the nutritional ingredients 12 are arranged in a central compartment of the capsule 9, while the probiotics 12 are provided in an off-center compartment, e.g. a compartment surrounding the main compartment for the nutritional ingredients 12. In this example, the high temperature injection 17 can be carried out more centrally than the off-centred injection for the low temperature liquid 18.

In case a central outlet 4 for the capsule 9 is provided, the separation wall 28 between the probiotics compartment and the main ingredients compartment can be arranged to be perforated or become porous or disappear such as by dissolution or dispersion (see reference numeral 29 indicating through-holes) such that it can be guaranteed that the probiotics are conveyed at first to the outlet 4 of the capsule and then to the receptacle 2 together with a low temperature liquid. The separation wall 28 may also have a controlled porosity to control, e.g., delay, the passage of probiotics through the wall.

Figure 10A:
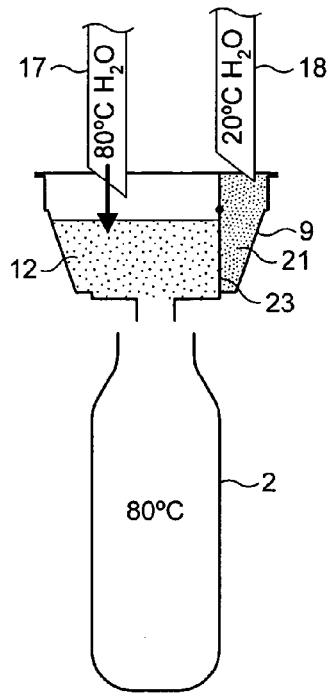
FIGS. 10A, 10B and 10C show an embodiment of a capsule in which probiotics are provided in a compartment separated from the other ingredients by a valve system.
Figure 10B:
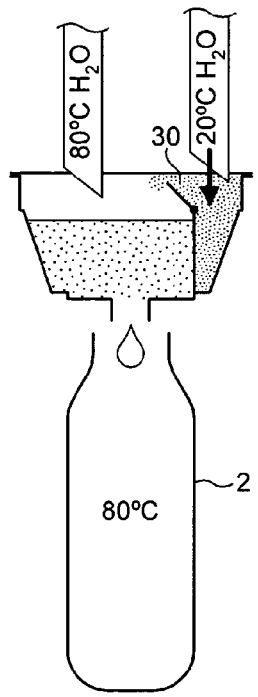
Figure 10C:
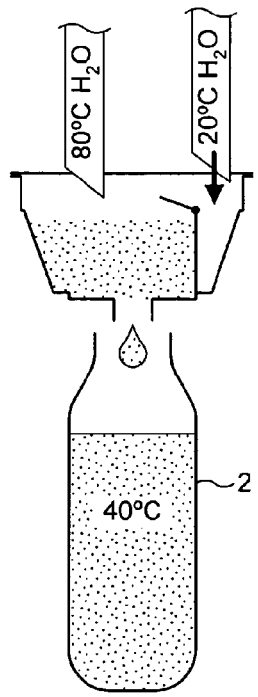

FIGS. 10A-10C show an example in which the probiotics 21 in a first compartment are separated from the nutritional ingredients 12 in a second compartment via a vertical separation wall 23. In this embodiment a valve system generally referred to with the numeral 30 is foreseen when a low temperature injection into the small chamber for the probiotics 21 is carried out, the pressure can activate (open) the valve 30 in order to release the probiotics 21, which will be carried to the receptacle 2 together with the low temperature liquid. For instance, the valve can be a one-way silicone valve such as a slit or diaphragm valve.

Figure 11A:
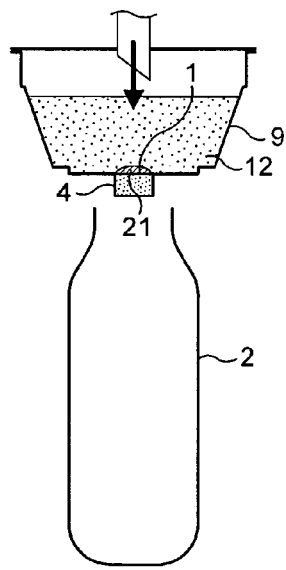
FIG. 11 shows an embodiment of a capsule in which probiotics are provided in the outlet spout and are separated from the other ingredients by an antimicrobial filter.
Figure 11B:
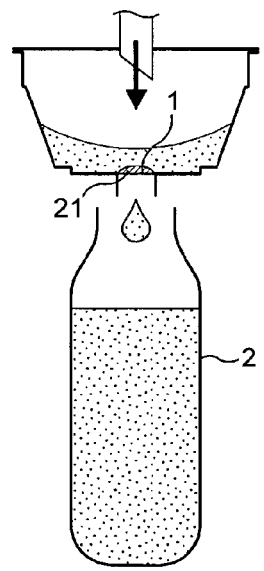

Finally, the embodiment on FIGS. 11A-11B show an arrangement in which only one liquid injection is carried out. Preferably the single liquid injection is carried with a temperature which is readily consumable also for children or elderly people. This temperature will be in the range of between 30° C. and 50° C.

In this example the probiotics are arranged in the outlets about 4 of the capsule 9 and are separated from the non-desired microorganisms containing ingredients 12 via an anti-microbial filter 1.

Figure 12:
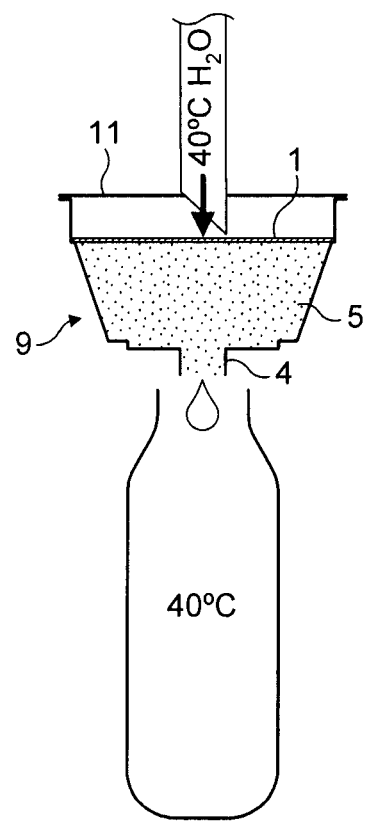
FIG. 12 shows another embodiment of a capsule in which the ingredients are mixed together in the same chamber including the probiotics and an antimicrobial filter is present in the capsule upstream of the chamber.

Finally, FIG. 12 proposes another embodiment of capsule 9 in which the capsule has only one ingredient containing chamber 5. Therefore, the chamber holds the main nutritional ingredients, i.e., proteins, carbohydrates, lipids, micronutrients, etc., and additionally heat sensitive bioactive ingredients such as probiotics. The capsule further comprises an antimicrobial filter which is placed upstream of the chamber, preferably, between the lid membrane and the chamber. As for the other described embodiments, the opening and/or filtering structure of the capsule at its bottom side has been omitted. In this case, a single liquid injection is carried out through the injection lid 11 by a needle that supplies a liquid, preferably water at temperature below the temperature at which the heat sensitive ingredients are susceptible to be degraded, killed or otherwise inactivated. Preferably, the liquid is supplied in the capsule at a temperature of about 35 (+/−5)° C. in one stream. A certain gap is maintained between the lid 11 and the filter 1 to ensure insertion of the needle without risk of rupturing the filter. In this case, the liquid injected in the capsule is removed from the non-desirable microorganisms by the filter 1 before it is mixed with the ingredients in chamber 5.

Of course, the invention encompasses many possible variants and improvements without departing from the scope of the claims attached. For instance, the pierceable lid of the capsule can be replaced by a lid with pre-made injection holes. Therefore, the supply of liquid in the capsule can be provided by a duct which is not formed as a needle. For instance, the bottom opening structure can be replaced by simple openings filtering the liquid. The capsule can be wrapped or packed in a gastight packaging if necessary which can be flushed with inert gas.

The invention claimed is:

1. A capsule for use in a beverage production device, the capsule containing ingredients for producing a nutritional liquid when a liquid is fed into the capsule at an inlet face thereof, the capsule comprising:
   heat sensitive bioactive components selected from the group consisting of probiotic microorganisms, lactoferrin, immunoglobulins, milk fat globule membrane fractions (FGM), growth factors, DHA, DGLA and combinations thereof, and
   the heat sensitive bioactive components are physically separated from at least a part of the ingredients by at least one separation wall which has a characteristic selected from the group consisting of permeability to a liquid and impermeability to a liquid, the separation wall extending longitudinally in the capsule in a direction of the flow path in the capsule from the inlet face to an outlet face.

2. The capsule according to claim 1, wherein the heat sensitive bio active components are probiotic microorganisms.

3. The capsule according to claim 1, wherein the separation wall is an antimicrobial filter.

4. The capsule according to claim 3, wherein the antimicrobial filter has a pore size of less than 1 μm.

5. The capsule according to claim 1, wherein the at least one separation wall has the characteristic of permeability to a liquid.

6. The capsule according to claim 1, wherein the ingredients forms an infant formula powder.

7. A capsule for use in a beverage production device, the capsule containing ingredients for producing a nutritional liquid when a liquid is fed into the capsule at an inlet face thereof, the capsule comprising:
   an antimicrobial filter extending longitudinally in the capsule in a direction of the flow path in the capsule from the inlet face to an outlet face; and
   probiotic microorganisms physically separated from at least a part of the ingredients by the antimicrobial filter.

* * * * *